(12) United States Patent
Radich

(10) Patent No.: US 7,471,746 B2
(45) Date of Patent: Dec. 30, 2008

(54) WHITENING OF DATA-DEPENDENT, NON-STATIONARY NOISE IN AN INTER-SYMBOL INTERFERENCE CHANNEL DETECTOR

(75) Inventor: William M. Radich, Chaska, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 783 days.

(21) Appl. No.: 10/975,221

(22) Filed: Oct. 28, 2004

(65) Prior Publication Data

US 2006/0093075 A1 May 4, 2006

(51) Int. Cl.
*H04L 27/06* (2006.01)
*H04B 1/10* (2006.01)

(52) U.S. Cl. .................. 375/341; 375/346; 375/350; 714/795

(58) Field of Classification Search ................ 375/262, 375/340, 341, 346, 348, 350; 714/795, 796; 360/55, 65, 39, 46
See application file for complete search history.

(56) References Cited

U.S. PATENT DOCUMENTS

| | | | | |
|---|---|---|---|---|
| 4,631,735 A * | 12/1986 | Qureshi | ...................... | 375/346 |
| 4,833,693 A * | 5/1989 | Eyuboglu | .................... | 714/795 |
| 5,488,633 A * | 1/1996 | Laroia | ......................... | 375/341 |
| 6,134,265 A * | 10/2000 | Long | .......................... | 375/350 |
| 6,201,839 B1 | 3/2001 | Kavcic et al. | ............... | 375/341 |
| 6,282,251 B1 | 8/2001 | Worstell | ..................... | 375/341 |
| 6,438,180 B1 | 8/2002 | Kavcic et al. | ............... | 375/341 |
| 6,570,919 B1 | 5/2003 | Lee | ............................. | 375/233 |
| 6,600,617 B1 | 7/2003 | Zeng | ............................ | 360/68 |
| 7,277,472 B2 * | 10/2007 | Li et al. | ...................... | 375/341 |
| 2001/0056450 A1 | 12/2001 | Kiriaki | ........................ | 708/300 |
| 2003/0037084 A1 | 2/2003 | Walsh et al. | ................ | 708/322 |
| 2004/0032683 A1 | 2/2004 | Ashley et al. | ................. | 360/46 |
| 2004/0071206 A1 | 4/2004 | Takatsu | ....................... | 375/232 |
| 2004/0076245 A1 | 4/2004 | Okamoto et al. | ............ | 375/341 |

OTHER PUBLICATIONS

"The Viterbi Algorithm and Markov Noise Memory," IEEE Transactions on Information Theory, vol. 46, No. 1, Jan. 2000.

* cited by examiner

*Primary Examiner*—Betsy L Deppe
(74) *Attorney, Agent, or Firm*—Westman, Champlin & Kelly, P.A.

(57) ABSTRACT

A decoder includes cascaded lattice filters that receive encoded data and include adaptive inputs and output taps. A tap control couples a selected output tap to a viterbi input as a function of a viterbi output. A noise adaptation circuit provides adjustment to the adaptive inputs as a function of the viterbi output to whiten non-stationary noise that is received with the encoded data.

19 Claims, 7 Drawing Sheets

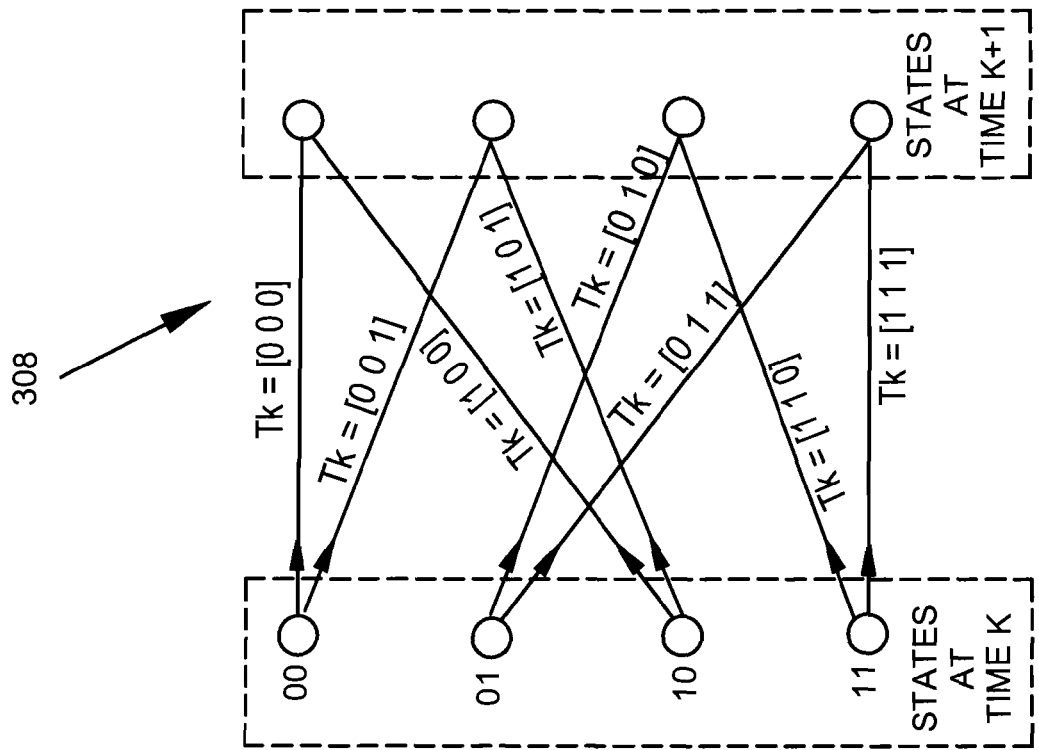
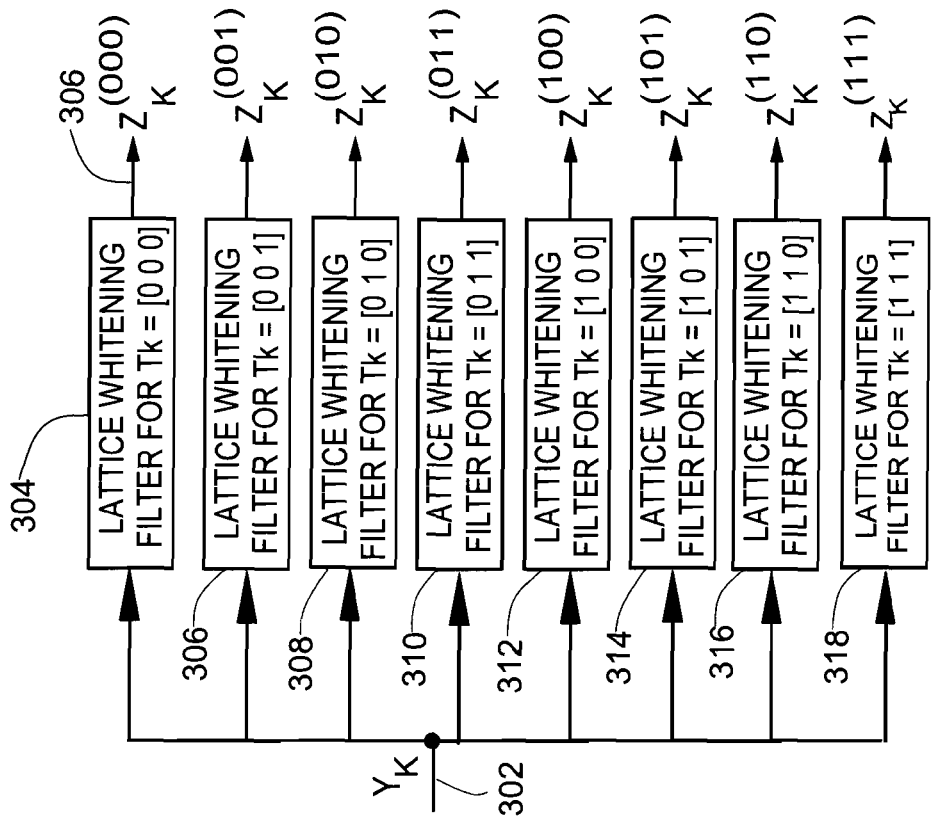
FIG. 5A
FIG. 5B

WHITENING OF DATA-DEPENDENT, NON-STATIONARY NOISE IN AN INTER-SYMBOL INTERFERENCE CHANNEL DETECTOR

FIELD OF THE INVENTION

The present invention relates generally to data detection in communication channels subject to inter-symbol interference (ISI), and more particularly but not by limitation to detectors that are subject to data-dependent, nonstationary noise.

BACKGROUND OF THE INVENTION

Data communication detectors are used in read channels of disc drives. State of the art detectors employ Data-Dependent Noise Whitening (DDNW) metrics, either in the branch metrics of a Viterbi detector, or in a post-processor that effectively 'corrects' decisions made by a non-DDNW metric Viterbi. The data-dependent noise whitening process is accomplished with a finite-impulse response (FIR) discrete time filter, implemented in hardware as a transversal filter structure.

The required data-dependent transversal filter coefficients for noise whitening are estimated or adapted using a Least Means Squared (LMS) algorithm. The LMS algorithm used with a transversal filter structure, however, has slow filter convergence, especially when the filter input correlation matrix has a large eigenvalue spread, such as occurs with high density magnetic recording. In addition, a digital transversal filter implementation requires a priori fixed range and resolution of the data-dependent coefficients for finite precision representation. However, since each transversal filter coefficient must be allowed to take a different value for each data pattern considered, there is in practice no way to know beforehand how to optimally choose finite precision range and resolution for this structure.

The transversal structure also does not allow for efficient order-decoupling or modularity. In other words, if the optimal Lth order whitening transversal filter has been calculated, one must re-calculate the values of all filter coefficients in order to achieve the optimal (L+1)th order filter. Each time the order of the filter changes, there is a requirement to recalculate the values of all filter coefficients. The transversal filters are not modular filters.

A noise whitening filter structure is needed that provides efficient whitening of data-dependent noise for the purpose of data detection over inter-symbol interference channels without suffering the disadvantages inherent in the transversal structure. Embodiments of the present invention provide solutions to these and other problems, and offer other advantages over the prior art.

SUMMARY OF THE INVENTION

Disclosed is a decoder that comprises cascaded lattice filters. The cascaded lattice filters receive encoded data. The cascaded lattice filters include adaptive inputs and output taps. The decoder also comprises a Viterbi path memory unit and survival register unit circuit with a Viterbi input and a Viterbi output.

The decoder includes a tap control. The tap control couples a selected output tap to the Viterbi input as a function of the Viterbi output. The decoder includes a noise adaptation circuit. The noise adaptation circuit provides adjustment to the adaptive inputs as a function of the Viterbi output to whiten non-stationary noise that is received with the encoded data.

Other features and benefits that characterize embodiments of the present invention will be apparent upon reading the following detailed description and review of the associated drawings.

BRIEF DESCRIPTION OF THE DRAWINGS

FIG. 5A illustrates the cascaded lattice filter of FIG. 4A in a "stacked" direction relative to FIG. 4A.
FIG. 5B illustrates a trellis state diagram for the cascaded lattice filter of FIG. 4A.

DETAILED DESCRIPTION OF ILLUSTRATIVE EMBODIMENTS

Some physical communication channels for transmission of digital data are subject to non-stationary noise, which is difficult for a conventional Viterbi detector to correct, where each trellis branch, or transition, represents a noiseless value conditioned on a hypothesized binary data sequence. In practice, however, there is a special class of non-stationary noise referred to as 'data-dependent' noise. Data-dependent noise appears statistically stationary when conditioned on the transmission of certain data-sequences, and therefore a conventional Viterbi detector can be augmented such that the branch metric for a given trellis branch is conditioned on a noiseless value, and the data-dependent noise statistics associated with the given transition. In the embodiments described below, cascaded multistage lattice filters are utilized to accomplish the required data-dependent noise whitening (DDNW) operation that is inherent in DDNW-metric Viterbi detection. The order-decoupling property of lattice filter structures is exploited to allow for independent adaptation of each lattice structure, and also to allow for an overall detector that can dynamically add or delete lattice stages to efficiently trade off between detection capability and associated circuit power consumption.

The detection comprises multiple cascaded lattice filter stages in the path metric of a Viterbi-like detector. Each individual cascaded lattice filter comprises multiple lattice filter stages, where an individual lattice filter stage is defined by a single filter coefficient. In addition, each lattice filter stage implements a unique Lth order data-dependent whitening filter for the data dependent noise associated a Viterbi trellis branch. Each data-dependent lattice whitening filter receives data-symbol rate samples that have been equalized by a front-end FIR filter to a specific partial response target.

The cascaded lattice filters include adaptive inputs and output taps for each lattice stage. The detector includes a tap control. The tap control couples a selected lattice stage output tap to the Viterbi path metric unit.

The detector includes a decision-directed noise adaptation circuit. The noise adaptation circuit provides adjustment to the adaptive inputs of the lattice filter selected as a function of the Viterbi output, and thus adaptively optimizes the lattice filter coefficients so as to whiten non-stationary noise that is received with the equalized symbol-rate data. The arrangement can be used, for example in a read channel of a disc drive such as the one illustrated in FIG. 1.

Figure 1:
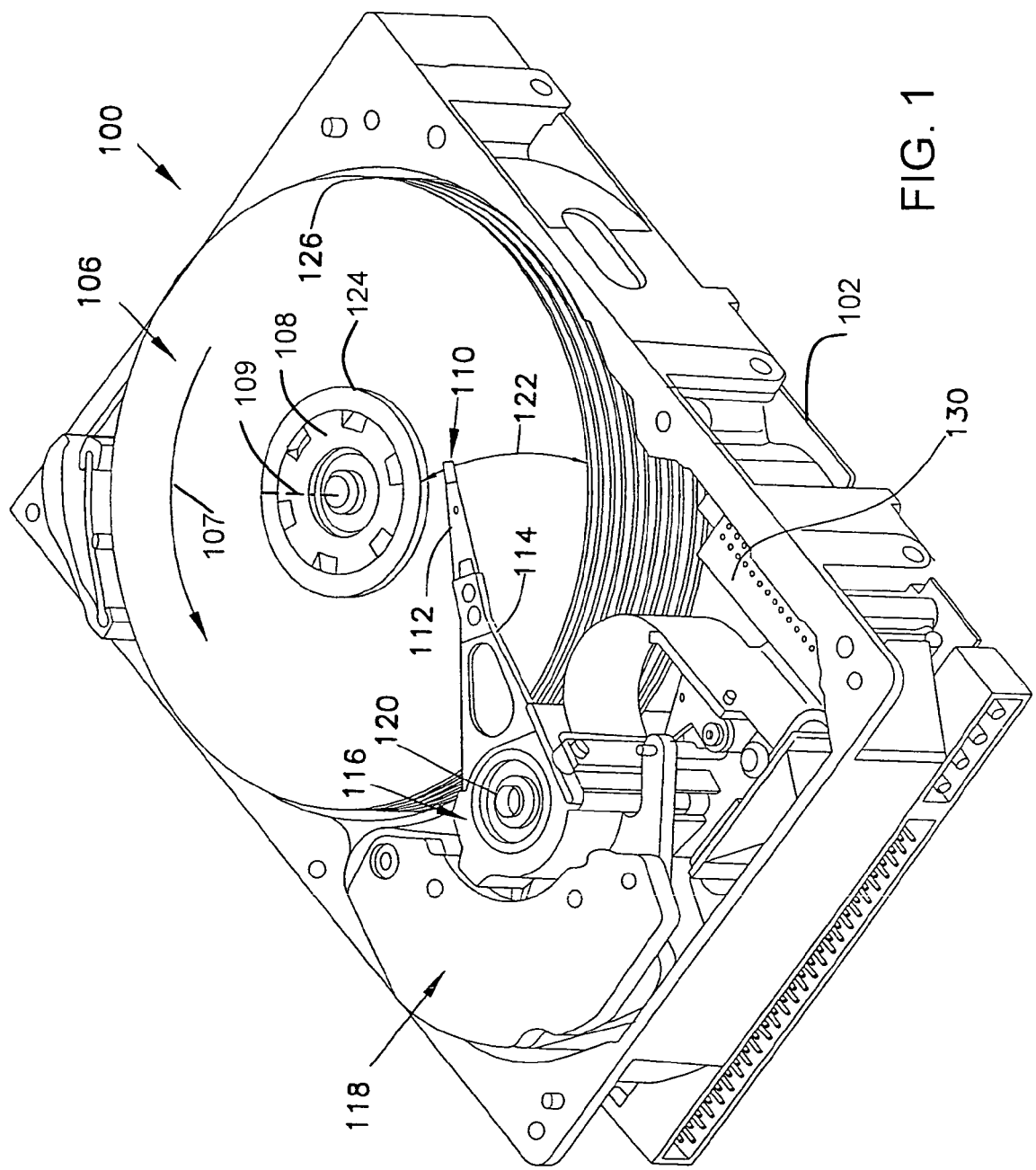
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109 in a direction indicated by arrow 107. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by electronics 130 based on signals generated by heads 110 and a host computer (not shown). Electronics 130 includes an encoder and a decoder for data stored on the data tracks. The disc drive 100 comprises one example of data communication channel. Another example of a communication channel is described below in connection with FIG. 2.

Figure 2:
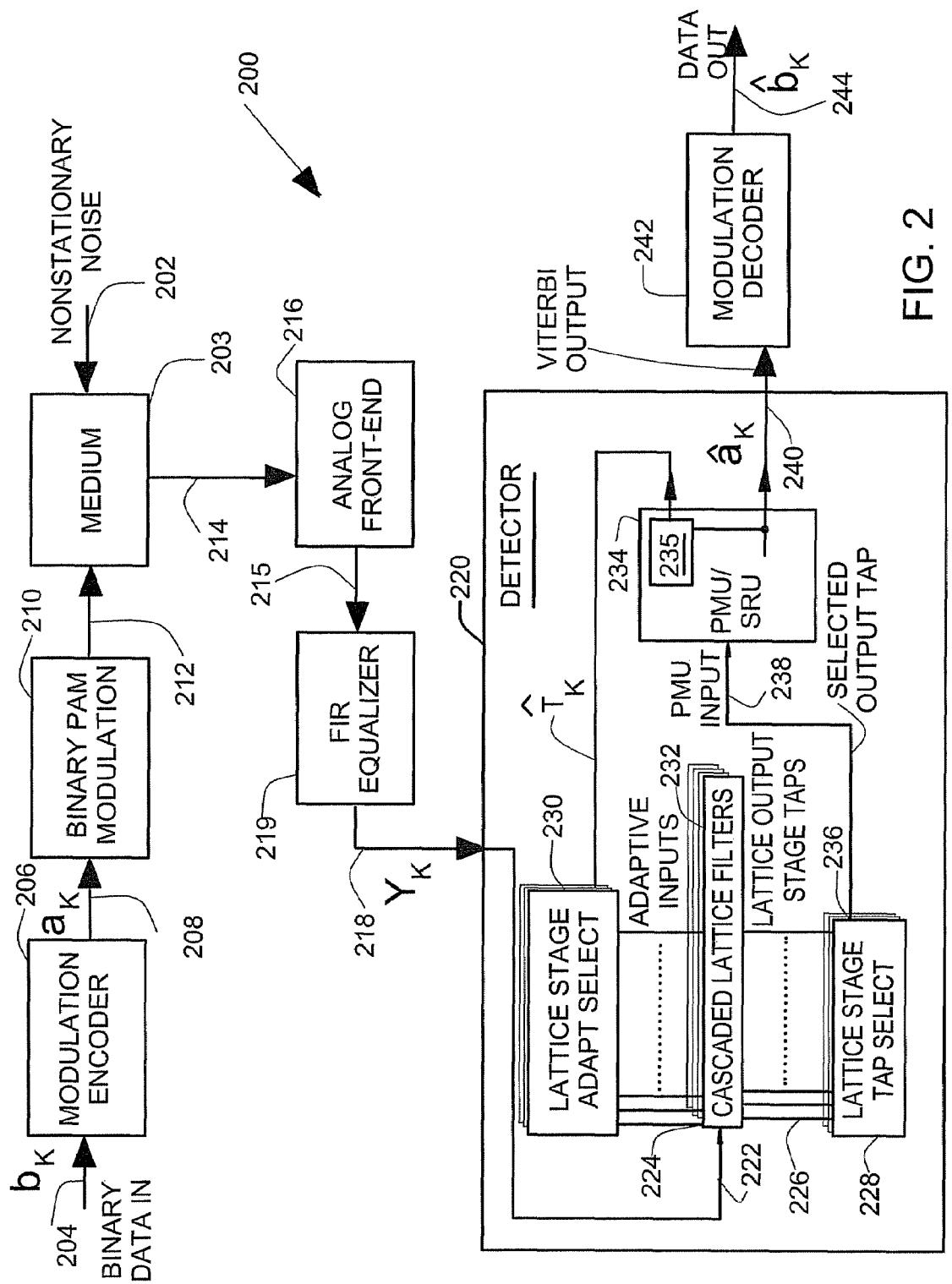
FIG. 2 illustrates a communication channel.

FIG. 2 illustrates a communication channel that receives binary data in 204 and provides data out 244. The communication channel 200 is adaptable to a wide variety of communication applications. Channel 200 is subject to transmission errors due to the presence of non-stationary noise 202 introduced in a physical communication medium 203. The term "non-stationary noise" as used in this application means a noise for which the first and second order statistics vary as a function of time.

In an example of a disc drive read/write channel, for example, first and second order statistics can vary by location on the magnetic media of a disk drive. One example of data-dependent non-stationary noise is the media noise that exists only at the boundary of magnetic media transitions, e.g. flux reversals in saturation recording. Written data sequences that result in a long run of no transitions result in readback waveforms that exhibit essentially no media noise.

In another example, multipath fading in a digital radio link includes propagation path variations that result in non-stationary noise in a received digital radio signal. Additionally, any digital pulse-amplitude modulation (PAM) method that suffers from clock jitter will yield received waveforms with data-dependent, non-stationary noise contributions.

In FIG. 2, an encoder 206 receives the input binary data $b_k$ 204 that is not encoded for transmission over the physical medium 203. The encoder 206 provides encoded data $a_k$ 208 to a PAM modulation operation 210. An example of an encoder 206 is a block code that prevents long runs of binary 0's or 1's to facilitate timing or phase recovery operations at the receiver. The PAM modulator 210 converts the encoded binary data $a_k$ 208 into a sequence of analog waveforms 212 suitable for transmission through the medium 203 (for instance, in a magnetic recording example, the modulation operation 210 represents the generation of a write current used to saturate the magnetic media in one direction or another). In another example, the combination of modulator 210 and transmission medium 203 comprises a radio transmitter, and radio propagation through the atmosphere. A received, noisy, analog waveform 214 is subsequently processed by an analog front-end 216 which conditions the analog signal by analog filtering, preamplification, and extraction of a discrete-time, symbol-rate clock, noisy signal 215. The symbol-rate, discrete-time signal 215 is equalized with an FIR filter 219 so that a reduced noise signal portion of the FIR output, $Y_K$ 218 has a known, limited-extent, intersymbol interference (ISI) structure. The equalization process in the FIR equalizer 219 will typically result in adding statistical correlation to the data-dependent noise portion of $Y_K$ 218. In each example of modulation/medium transmission, the received, equalized, discrete-time signal 218 includes the effects of intersymbol interference, and data-dependent, correlated, non-stationary noise. An example of a signal processing path that produces a filtered, equalized signal $Y_k$ is described in more detail below in connection with FIG. 6.

The equalized signal $Y_K$ at 218 couples to an input 222 of multiple cascaded lattice whitening filters 232 in the detector 220. The multiple cascaded lattice whitening filters are illustrated in a stacked fashion in FIG. 2. The cascaded lattice filters 232 are utilized as part of the branch metric unit (BMU) operation for a Viterbi detector, and include adaptive inputs 224 that adjust cascaded lattice filter coefficients (reflection coefficients as described in more detail below in connection with FIG. 3). The cascaded lattice filters 232 include output stage taps 226 that provide outputs of successive individual lattice filter stages. A noise adaptation circuit 230 generates the adaptive coefficient updates 224 in a training mode. A lattice stage tap control 228 is used to statically or dynamically choose which stage of the lattice is required for an appropriate trade off between detection capability, and circuit power. The stage tap control 228 could thus be set by a register existing to communicate to the read channel (static), or else automatically 'stop' at a lattice stage with a coefficient <<1 in magnitude (automatic).

As part of the BMU operation, the cascaded lattice filters 232 perform a data-dependent whitening process on the input $Y_K$ 218 for each of the $2^{N+1}$ possible trellis transition sequences $T_k=[a_{k-N}, a_{k-N+1}, \ldots, a_{k-1}, a_k]$ represented by a trellis branch in a $2^N$ state Viterbi algorithm.

There are $2^{N+1}$ sets of lattice whitening filters (such as lattice whitening filters 304 in FIG. 5A) for the specific example of N=2, along with a portion of the corresponding 4-state Viterbi trellis (such as trellis 308 in FIG. 5B). In this case, each transition (represented by an arrow) from a trellis state at time K to a trellis state at time K+1 corresponds to a unique noiseless value, and also to a unique lattice whitening filter 304. The lattice filter coefficients corresponding to a given data-dependent transition $T_k$ are determined by the second order data-dependent noise statistics, conditioned on $T_k$.

The detector 220 includes a Viterbi path memory unit (PMU) and survival register unit (SRU) 234 used to keep track of the most likely binary data sequence represented by the Viterbi output $\hat{a}_k$ 240. The PMU/SRU unit includes a memory 235 which can be a shift register, a RAM, or other form of memory. The memory 235 receives a stream of outputs $\hat{a}_k$ 240 and produces the output $\hat{T}_K$. In turn, the estimated data sequence 240 is concatenated to form the estimated trellis transition sequence ($\hat{T}_K$) used to select which of the possible $2^{N+1}$ sets of lattice whitening filter coefficients should be adapted.

Adjustment of the adaptive inputs 224 to the cascaded lattice filters 232 is order-decoupled, or in other words modular. The adjustment of an adaptive coefficient by adaptive inputs 224 on a particular lattice filter stage (in the cascaded lattice filters 232) is independent of the adjustment the following stages in the cascade. Two immediate benefits of this modularity are:

1. Adaptation of lattice coefficients can be performed one stage at a time, without loss of optimality, thus increasing convergence time, and decreasing the required adaptive circuitry.

2. In contrast to transversal filter structures, lattice stages can be increased to obtain better detection capability, or decreased to save on complexity and power consumption, without the need to recalculate all filter coefficients.

The Viterbi output ($\hat{a}_K$) represents the maximum-likelihood estimate of $a_k$ for an ISI channel in the presence of data-dependent, Gauss-Markov noise. The modulation decoder 242 recovers an estimate ($\hat{b}_K$) 244 of the original data sequence ($b_K$) 204, and can either be sent for further error control decoding, or formatted and resynchronized for use with a host system such as a computer.

The arrangement shown in FIG. 2. avoids the use of transversal structures in the BMU for data-dependent noise whitening, which are typically adapted with a least-mean-square (LMS) algorithm. Note that for optimal convergence speed of transversal filters, the LMS algorithm must be applied simultaneously to all transversal filter coefficients, and is also known to suffer slow convergence when the filter input correlation matrix has a large eigenvalue spread, a condition common in high-density magnetic recording. Furthermore, transversal whitening filter coefficient representation in finite precision for digital implementation is not straightforward because a priori bounds on the coefficient ranges are unknown.

With the use of the lattice filter, the magnitude of each reflection coefficient is always less than or equal to one. With the use of lattice filters, finite precision implementation can be made more accurately than with the transversal structure. An example of a single lattice filter stage (within one of cascaded lattice filters) is described in more detail below in connection with FIG. 3. An example of cascaded lattice filters, a noise adaptation circuit and tap control are described in more detail below in connection with FIGS. 4A, 4B.

Figure 3:
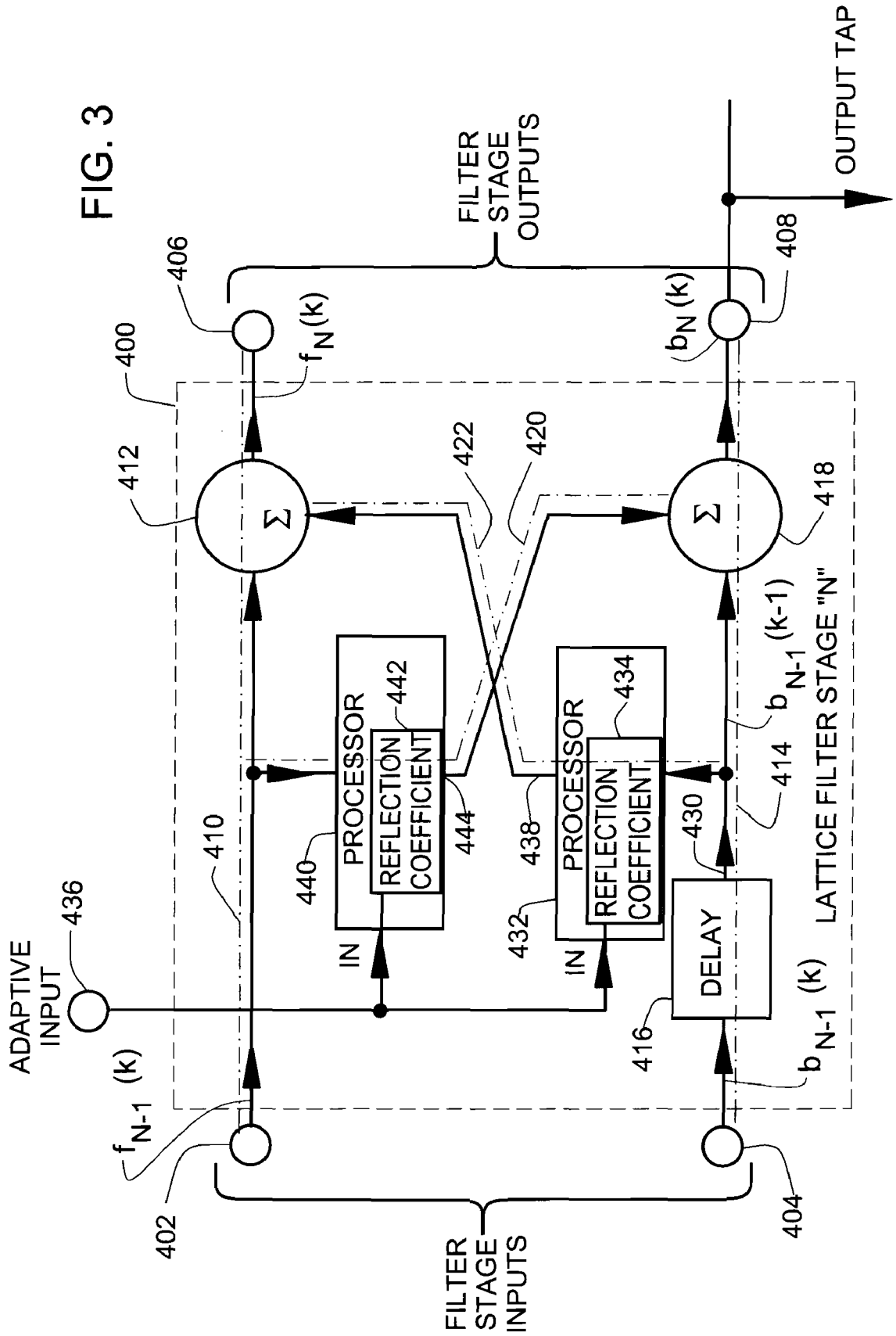
FIG. 3 illustrates a lattice filter stage.

FIG. 3 illustrates a lattice filter, also called a lattice filter stage, 400. The lattice filter 400 includes first and second inputs 402, 404 at a left side, and first and second outputs 406, 408 at a right side. The lattice filter stage 400 has a first signal processing path 410 that runs along a straight horizontal line that extends from the first input 402 through a summing junction 412 to the first output 406. The lattice filter stage 400 has a second signal processing path 414 that runs along a straight horizontal line that extends from the second input 404 through a delay element 416 and a summing junction 418 to the second output 408. The lattice filter stage 400 has a second signal processing path 414 that runs along a straight horizontal line that extends from the second input 404 through a delay element 416 and a summing junction 418 to the second output 408.

The lattice filter stage 400 has a first lattice (crossover) signal processing path 420 that serves to bridge signals derived from the first input 402 to the second output 408. The lattice filter stage 400 has a second lattice (crossover) signal processing path 422 that serves to bridge signals derived from the second input 404 to the first output 406. The lattice (crossover) topology shown in FIG. 4 can also be depicted as an equivalent bridge network with inputs on one set of opposite bridge nodes and outputs on another set of opposite bridge nodes (not shown).

The second input 404 couples to the delay element 416. The delay element 416 provides a delayed output 430 to the summing junction 418 and to a processor 432 in the second lattice path 422. The processor 432 has a reflection coefficient 434 that is adjusted by an adaptive input 436. The processor 432 provides a processor output 438 to the summing junction 412. The summing junction 412 sums the processor output 438 and the first input 402. The summing junction 412 generates the first output 406. Adjustment of the reflection coefficients is independent of the output tap selected by the tap control.

The first input 402 couples to a processor 440. The processor 440 has a reflection coefficient 442 that is adjusted by the adaptive input 436. The processor 440 provides a processor output 444 to the summing junction 418. The summing junction 418 sums the processor output 444 and the delayed output 430. The summing junction 418 provides the second output 408. A cascaded series of lattice filters such as lattice filter 400 is described below in connection with FIG. 5.

The term "reflection coefficient" refers to a processor gain that is less than or equal to one in magnitude for both processors 432, 440. Both processors 432, 440 in a given lattice filter stage preferably have identical reflection coefficients. The processor gain is a ratio of processor output to processor input.

Figure 4A:
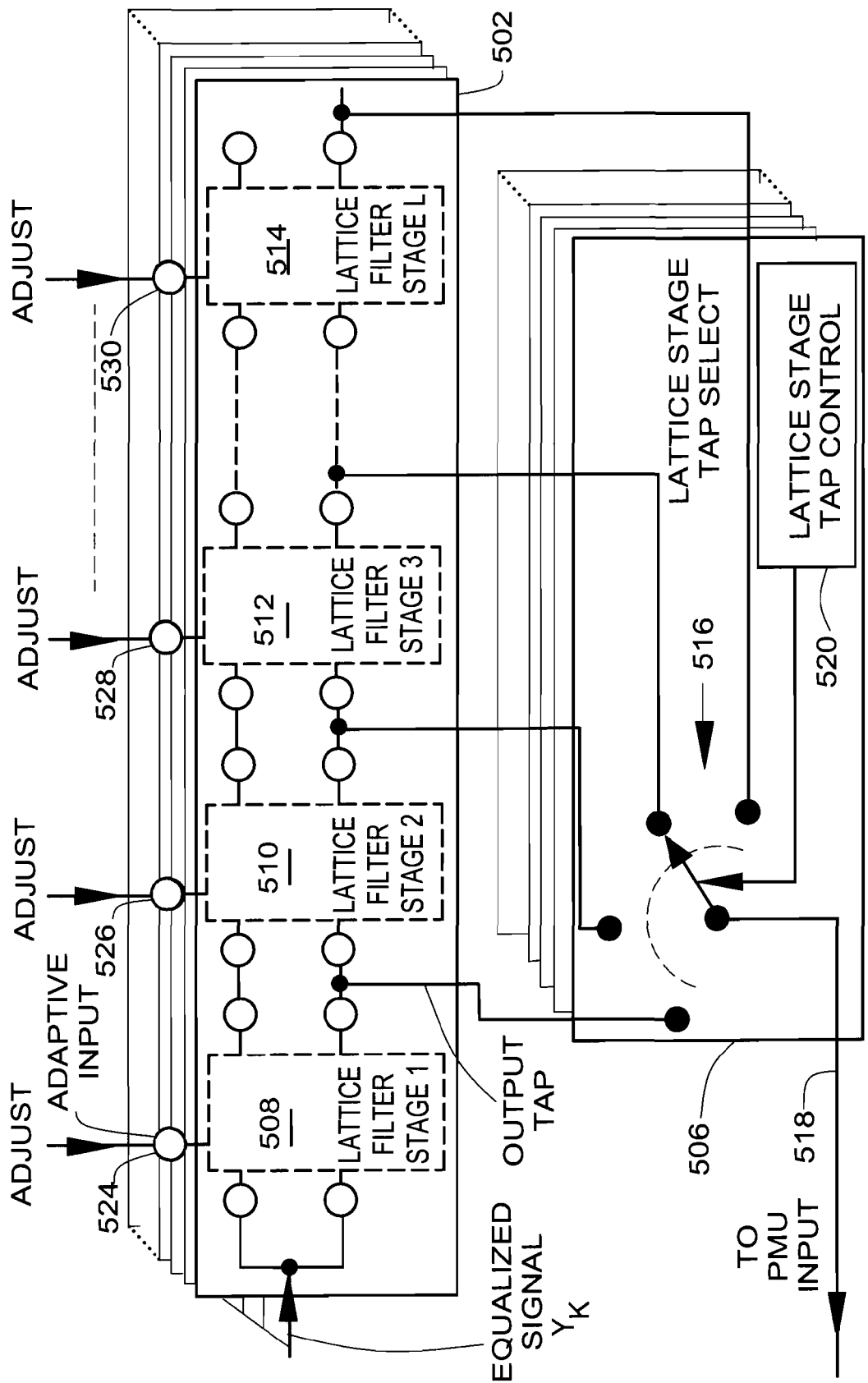
FIG. 4A illustrates an adaptive lattice circuit in an operating mode.
Figure 4B:
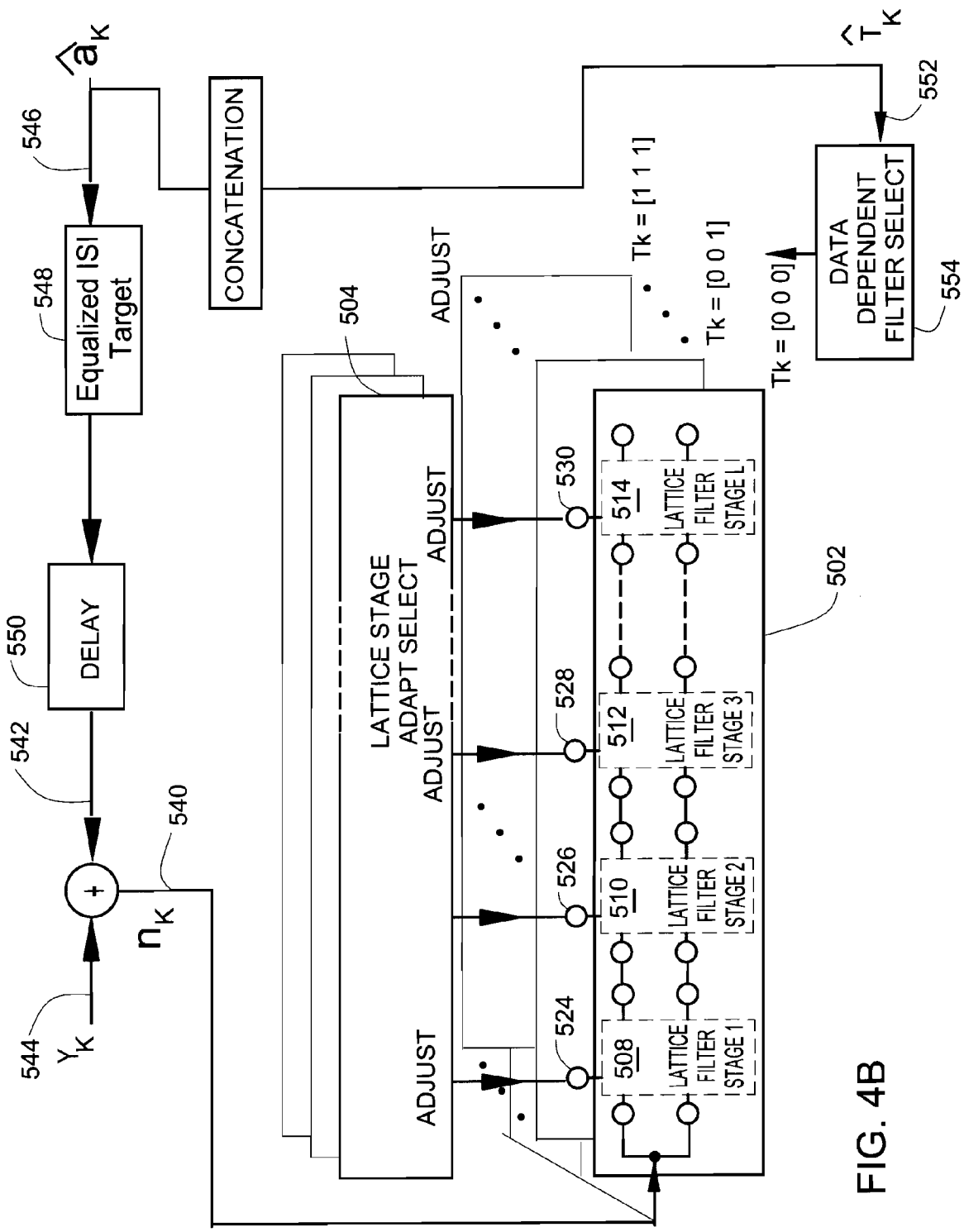
FIG. 4B illustrates the adaptive lattice circuit of FIG. 4A in a training mode.

FIG. 4A illustrates an example of cascaded lattice filters 502 and a lattice stage tap select 506 in an operational mode. FIG. 4B illustrates the same cascaded lattice filters 502 together with a lattice stage adapt select 504 in a training mode. The cascaded lattice filters 502 in FIGS. 4A, 4B comprise lattice filter stages 508, 510, 512, . . . 514 that are connected in cascade, i.e., the outputs of one lattice stage are connected to the corresponding inputs of the next subsequent lattice stage. Each lattice output stage includes an output tap that connects to the lattice stage tap select 506 (shown in FIG. 4A).

The lattice stage tap select 506 includes a switch 516 that provides only one selected output tap at a time on line 518 to a Viterbi input (such as PMU input 238 in FIG. 2). The lattice stage tap select 506 includes a lattice stage tap control circuit 520. The lattice stage tap control circuit 520 can be a dynamic or user-programmable (static) control. An example of static control would have the user set the number of desired stages for each whitening filter via a register on the read channel. An alternate, dynamic control might sense the reflection coefficient magnitude at each stage 508, 510, . . . , 514, and be configured to stop at some stage L*, such that reflection coefficient magnitudes are smaller than some defined threshold for L>L*. As the data and the output tap selected change over time, there is no need to readjust adaptive inputs 524, 526, 528, 530 of the cascaded lattice filters because adjustment is independent of the output tap that is selected.

The lattice stage adapt select circuit 504 (FIG. 4B) consecutively enables lattice stages, one at a time, from 1=1, 2, . . . L for training of the reflection coefficients. In one example of this circuit, a synchronized counter is utilized. The adaptation is made so as to minimize the data-dependent noise $n_k$ 540 correlation at the output of each lattice stage. The noise sample $n_k$ 540 is regenerated in a decision-directed mode by subtracting the noisy, equalized signal $Y_k$ 544 from a regenerated noiseless sample 542. The regenerated noiseless sample 542 is constructed by filtering Viterbi decisions $\hat{a}_K$ 546 with the equalized ISI target 548 and delaying this sample by an amount 550 determined by the length of the Viterbi survival registers.

The Viterbi decisions ($\hat{a}_K$) 546 are then concatenated into the appropriate length transition sequence ($\hat{T}_K$) 552, and this sequence is used by the data dependent filter select 554 to select which whitening filter is to have its lattice stage adapted.

FIG. 5A illustrates the cascaded lattice filter of FIG. 4A in a "stacked" direction relative to FIG. 4A. As illustrated in FIG. 5A, there are $2^{N+1}$ sets of cascaded lattice whitening filters 304, 306, 308, 310, 312, 314, 316, 318 for the specific example of N=2. Each of the stacked whitening filters receives the input 302 $Y_K$. Each of the filters 304, 306, 308, 310, 312, 314, 316, 318 provide an output $Z_K$ that, taken together constitute the cascaded filter outputs.

A portion of an exemplary corresponding 4-state Viterbi trellis state diagram 308 is illustrated in FIG. 5B. Each trellis state at times K and K+1 is represented by a circle in FIG. 5B. Each transition (represented by an arrow) from a trellis state at time K to a trellis state at time K+1 corresponds to a unique noiseless value, and also to a unique one of the lattice whitening filters 304-318. The lattice filter coefficients corresponding to a given data-dependent transition $T_k$ are determined by the second order data-dependent noise statistics, conditioned on $T_k$.

Figure 6:
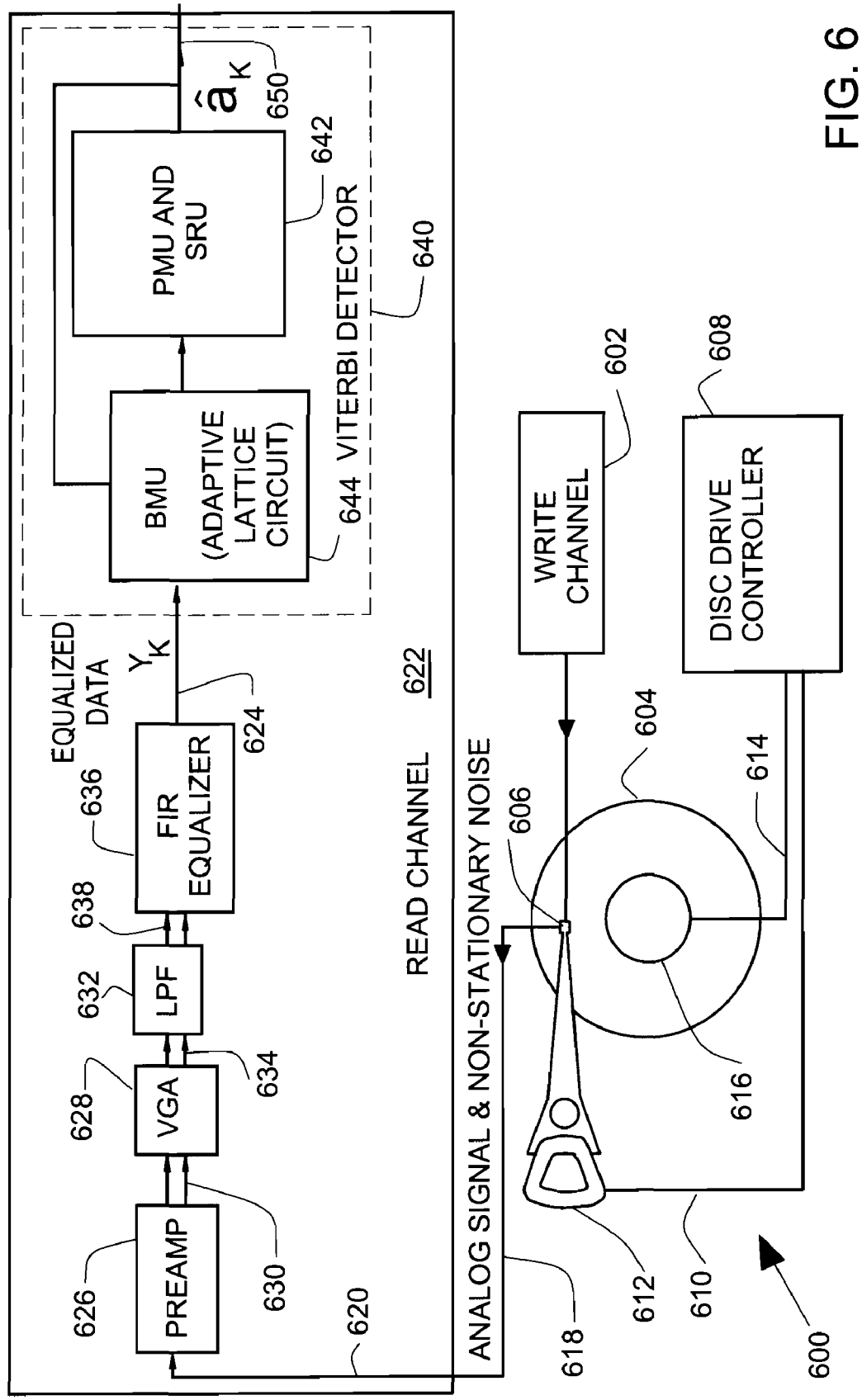
FIG. 6 illustrates a block diagram of a disc drive.

FIG. 6 illustrates a block diagram of a disc drive 600. The disc drive 600 includes a write channel 602 that receives data from a host (not illustrated). The write channel 602 encodes the data into a multilayer protocol suitable for writing to a disc, and provides encoded data to a head 606 for writing on a magnetic storage disc 604 in the disc drive 600. The disc drive 600 includes a disc controller 608 that provides a control output 610 to a voice coil 612 that positions the head 606. The disc controller 608 also provides an electrical drive 614 to a disc motor 616 that spins the disc 604.

The head 606 reads the encoded data written on the disc 604 and couples the readback signal along a line 618 to a data input 620 of a read channel 622. The analog data at data input 620 includes non-stationary noise due to the writing and reading processes. The read channel 622 passes the readback signal through a series of processing blocks that are arranged in cascade to provide an equalized output $Y_K$ at 624. The cascaded processing blocks in the read channel 622 include a preamplifier 626 that receives input 620, a variable gain amplifier (VGA) 628 that receives a preamplifier output 630, an adjustable low pass filter 632 that receives a variable gain amplifier output 634, and a finite impulse response (FIR) filter 636 that receives a low pass filter output 638. The FIR filter 636 generates the read channel output $Y_K$ at 624 which couples to a Viterbi detector 640. The read channel output $Y_K$ includes equalized data that is corrupted by non-stationary noise. The non-stationary noise can be primarily attributed to media noise of the disc 604. The Viterbi detector 640 includes a Viterbi path memory unit (PMU) and survival register unit (SRU) circuit 642 and an adaptive lattice or branch metric unit (BMU) circuit 644. The PMU and SRU circuit 642 generates a Viterbi output 650 that is provided as feedback to the adaptive lattice circuit 644. Non-stationary noise is used to adjust reflection coefficients in the adaptive lattice circuit 644, for example, as described above in connection with FIGS. 2-5. The Viterbi detector 640 can be implemented as shown in FIGS. 5A, 5B for example. The Viterbi output 650 provides data to a host system (not illustrated). The disc drive 600 thus serves as a communication channel for storing and reproducing data.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the decoder system while maintaining substantially the same functionality without departing from the scope and spirit of the present invention. In addition, although the preferred embodiments described herein is directed to disc drives and radio systems for digital data reproduction, it will be appreciated by those skilled in the art that the teachings of the present invention can be applied to other data storage devices and fiber optic communication, without departing from the scope and spirit of the present invention.

What is claimed is:

1. A decoder comprising:
   cascaded lattice filters that receive encoded data and that include adaptive inputs and output taps;
   a Viterbi path memory unit and survival register unit circuit with a Viterbi input and a Viterbi output;
   a tap control coupling a selected output tap from the cascaded lattice filters to the Viterbi input; and
   a noise adaptation circuit that provides an adjustment to the adaptive inputs as a function of an estimated trellis transition sequence to whiten non-stationary noise.

2. The decoder of claim 1 wherein the cascaded lattice filters include processors, each processor including a reflection coefficient that is adjusted by the adjustment.

3. The decoder of claim 2 wherein the adjustment of the reflection coefficients is independent of the output tap selected by the tap control.

4. The decoder of claim 2 wherein the adjustment comprises a plurality of adjustments for each cascaded lattice filter, each of the plurality of adjustments being independent of one another.

5. The decoder of claim 1 wherein the noise adaptation circuit provides the adjustment as a function of past noise.

6. The decoder of claim 1 wherein the noise adaptation circuit comprises a noise detector that generates a noise sample output indicating past noise samples in the Viterbi output.

7. The decoder of claim 1 wherein the encoded data is received from a communication medium that injects non-stationary noise into the encoded data and the selected tap output provides data in which the non-stationary noise is whitened.

8. The decoder of claim 1 wherein the Viterbi input has a fixed range, and the Viterbi path memory unit and survival register unit circuit has a fixed scale to process the fixed range.

9. The decoder of claim 1 wherein the Viterbi input has a fixed scale and the Viterbi path memory unit and survival register unit circuit has a fixed resolution to process the fixed scale.

10. A method of decoding, comprising:
    providing encoded data to cascaded lattice filters that include adaptive inputs and output taps;
    selecting an output tap from the cascaded lattice filters and providing the selected output tap to a Viterbi input of "a Viterbi path memory unit and survival register unit circuit" in order to overcome a lack of antecedent basis issue; and
    providing an adjustment to the adaptive inputs as a function of an estimated trellis transition sequence to whiten non-stationary noise.

11. The method of claim 10 wherein the cascaded lattice filters include processors with reflection coefficients, and:
    adjusting the reflection coefficients with the adaptive inputs.

12. The method of claim 11 further comprising:

adjusting the reflection coefficients independently from the output tap that is selected.

13. The method of claim 11, further comprising:

adjusting a reflection coefficient of each cascaded lattice filter independently from adjustment of the reflection coefficient of other cascaded lattice filters.

14. The method of claim 10, further comprising:

providing the adjustment as a function of past noise at the Viterbi output.

15. The method of claim 10, further comprising:

providing a noise detector indicating past noise samples in the Viterbi output.

16. The method of claim 10, further comprising:

receiving the encoded data from a communication medium that injects non-stationary noise into the encoded data; and providing decoded data at the Viterbi input with the non-stationary noise whitened.

17. The method of claim 10, further comprising:

providing the Viterbi input with a fixed range, and providing the Viterbi path memory unit and survival register unit circuit with a fixed scale to process the fixed range.

18. The method of claim 10, further comprising:

providing the Viterbi input with a fixed scale; and providing the Viterbi path memory unit and survival register unit circuit with a fixed resolution to process the fixed scale.

19. A decoder comprising:

cascaded lattice filters that receive encoded data and that include adaptive inputs and output taps;

a Viterbi path memory unit and survival register unit circuit with a Viterbi input and a Viterbi output; means for coupling a selected output tap from the cascaded lattice filters to the Viterbi input; and means for providing an adjustment to the adaptive inputs as a function of an estimated trellis transition sequence to whiten non-stationary noise.

* * * * *

UNITED STATES PATENT AND TRADEMARK OFFICE
CERTIFICATE OF CORRECTION

PATENT NO. : 7,471,746 B2
APPLICATION NO. : 10/975221
DATED : December 30, 2008
INVENTOR(S) : Radich Page 1 of 1

It is certified that error appears in the above-identified patent and that said Letters Patent is hereby corrected as shown below:

Delete paragraph in claim 10, line 56-60, and insert:

--selecting an output tap from the cascaded lattice filters and providing the selected output tap to a Viterbi input of a Viterbi path memory unit and survival register unit circuit; and--

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,471,746 B2  Page 1 of 1
APPLICATION NO. : 10/975221
DATED : December 30, 2008
INVENTOR(S) : Radich It is certified that error appears in the above-identified patent and that said Letters Patent is hereby corrected as shown below:

Delete paragraph in Column 8, claim 10, line 56-60, and insert:

--selecting an output tap from the cascaded lattice filters and providing the selected output tap to a Viterbi input of a Viterbi path memory unit and survival register unit circuit; and--

This certificate supersedes the Certificate of Correction issued September 1, 2009.

Signed and Sealed this

Twenty-second Day of September, 2009

David J. Kappos
*Director of the United States Patent and Trademark Office*